US012695580B2

(12) United States Patent
Fang et al.

(10) Patent No.: US 12,695,580 B2
(45) Date of Patent: Jul. 28, 2026

(54) PREEMPTION FOR LOW LATENCY APPLICATION BY USING NULL TONES OR DEDICATED RESOURCE UNIT (RU) FOR SUSPEND REQUEST FEEDBACK

(71) Applicant: Intel Corporation, Santa Clara, CA (US)

(72) Inventors: Juan Fang, Portland, OR (US); Danny Alexander, Neve Efraim Monoson (IL); Laurent Cariou, Milizac (FR); Qinghua Li, San Ramon, CA (US); Robert Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/476,192

(22) Filed: Sep. 27, 2023

(65) Prior Publication Data

US 2024/0022383 A1     Jan. 18, 2024

Related U.S. Application Data

(60) Provisional application No. 63/443,345, filed on Feb. 3, 2023.

(51) Int. Cl.
H04L 5/00 (2006.01)
(52) U.S. Cl.
CPC .......... H04L 5/0064 (2013.01); H04L 5/0053 (2013.01)

(58) Field of Classification Search
CPC ............................ H04L 5/0064; H04L 5/0053
See application file for complete search history.

(56) References Cited

U.S. PATENT DOCUMENTS

| 2016/0212625 A1* | 7/2016 | Damnjanovic ... H04W 74/0875 |
| 2020/0367263 A1 | 11/2020 | Cavalcanti et al. |
| 2023/0362996 A1* | 11/2023 | Cao ..................... H04B 7/15528 |
| 2025/0007850 A1* | 1/2025 | Zhu .......................... H04W 8/24 |

OTHER PUBLICATIONS

Extended European Search Report mailed May 29, 2024 in EP Application No. 23212232.5, 8 pages.

* cited by examiner

*Primary Examiner* — Wayne H Cai
(74) *Attorney, Agent, or Firm* — Gray Ice Higdon, PLLC

(57) ABSTRACT

This disclosure describes systems, methods, and devices related to low latency preemption. A device may establish time gaps between consecutive physical layer (PHY) convergence protocol data units (PPDUs) to facilitate preemption opportunity for low latency (LL) transmission. The device may detect a suspend/resource request (SR) transmitted over predefined null tones, wherein the SR is received from a station device (STA). The device may determine if a current transmit opportunity (TXOP) is preemptable and communicate this status through a control frame. The device may set a suspend request (SR) feedback report support subfield within an ultra high reliability (UHR) capabilities element based on a capability to support the SR feedback report.

20 Claims, 15 Drawing Sheets

| Preamble | MPDU 1→STA1 | MPDU 2→STA2 | MPDU 3→STA1 | MPDU 4→STA1 |
| --- | --- | --- | --- | --- |

FIG. 4

PREEMPTION FOR LOW LATENCY APPLICATION BY USING NULL TONES OR DEDICATED RESOURCE UNIT (RU) FOR SUSPEND REQUEST FEEDBACK

CROSS-REFERENCE TO RELATED APPLICATION(S)

This application claims the benefit of U.S. Provisional Application No. 63/443,345, filed Feb. 3, 2023, the disclosure of which is incorporated herein by reference as if set forth in full.

TECHNICAL FIELD

This disclosure generally relates to systems and methods for wireless communications and, more particularly, to preemption for low latency application by using null tones or dedicated resource unit (RU) for suspend request feedback.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIGS. 2-7 depict illustrative schematic diagrams for low latency preemption, in accordance with one or more example embodiments of the present disclosure.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In the 2022 July IEEE standard meeting, the Wi-Fi 8 ultra-high reliability study group was formed with the objectives of improving performance on:

Improve reliability of WLAN connectivity.

Reduce latency.

Increase manageability.

Increase throughput including at different SNR levels.

Reduce device-level power consumption.

When the 802.11 network experiences high traffic due to high throughput transmissions, it becomes challenging to support low-latency applications without adversely affecting the high throughput traffic. This complexity arises from the need to reconcile two conflicting requirements: 1) allowing long and efficient TXOPs for high throughput traffic, and 2) restricting the TXOP limit to reduce latency. Current IEEE802.11 does not allow transmission preemption.

In case the AP wants to allow for low latency transmissions, it may limit the maximum TXOP to the latency target, and through that provide opportunities for DL (or UL) transmissions every "T" millisecond (mSec).

One downside of the approach in "A" is that it reduces the overall channel efficiency (MAC and PHY).

Example embodiments of the present disclosure relate to systems, methods, and devices for Wi-Fi 8: Preemption for low latency application by using null tones or dedicated RU for suspend request feedback.

In one embodiment, a low latency preemption system may facilitate methods and mechanisms to reduce both the average and the worst-case latency for low latency applications in Wi-Fi networks while all the operation channels are being occupied with long TXOP data transmission by other STAs within the BSS at minimum performance impact to the high throughput traffic.

Low/deterministic latency and reliable communications are some of the main gaps in existing Wi-Fi radios (including 802.11be) and they are defined as one of the main targets in next-generation Wi-Fi standards, 802.11uhr (Wi-Fi 8). The mechanisms proposed in this disclosure will enable low latency applications in 802.11 networks that are heavily loaded with other clients' high throughput transmissions to improve latency performance, while at the same time minimizing the performance impact on the high throughput traffic.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Figure 1:
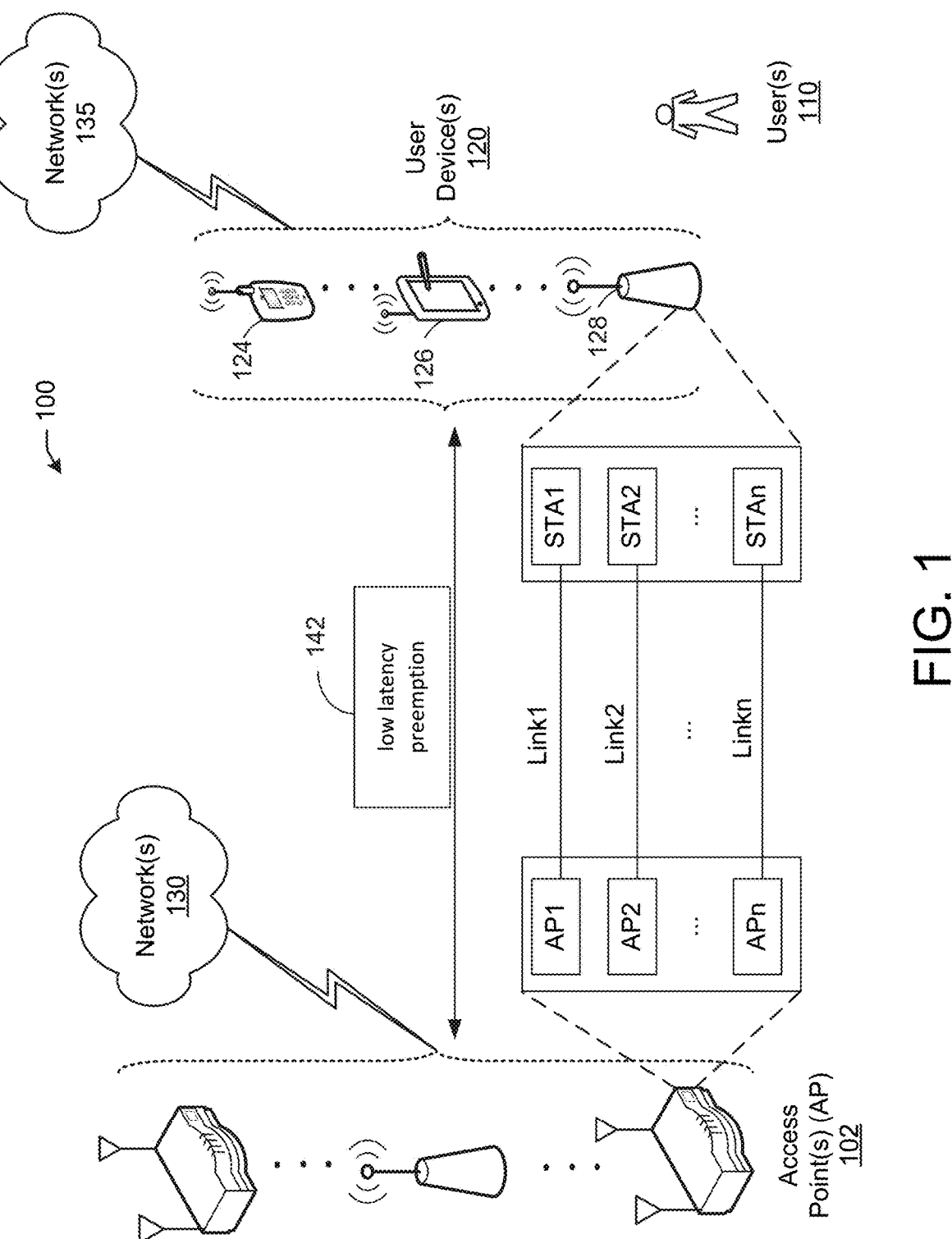
FIG. 1 is a network diagram illustrating an example network environment for low latency preemption, in accordance with one or more example embodiments of the present disclosure.

FIG. 1 is a network diagram illustrating an example network environment of low latency preemption, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 9:
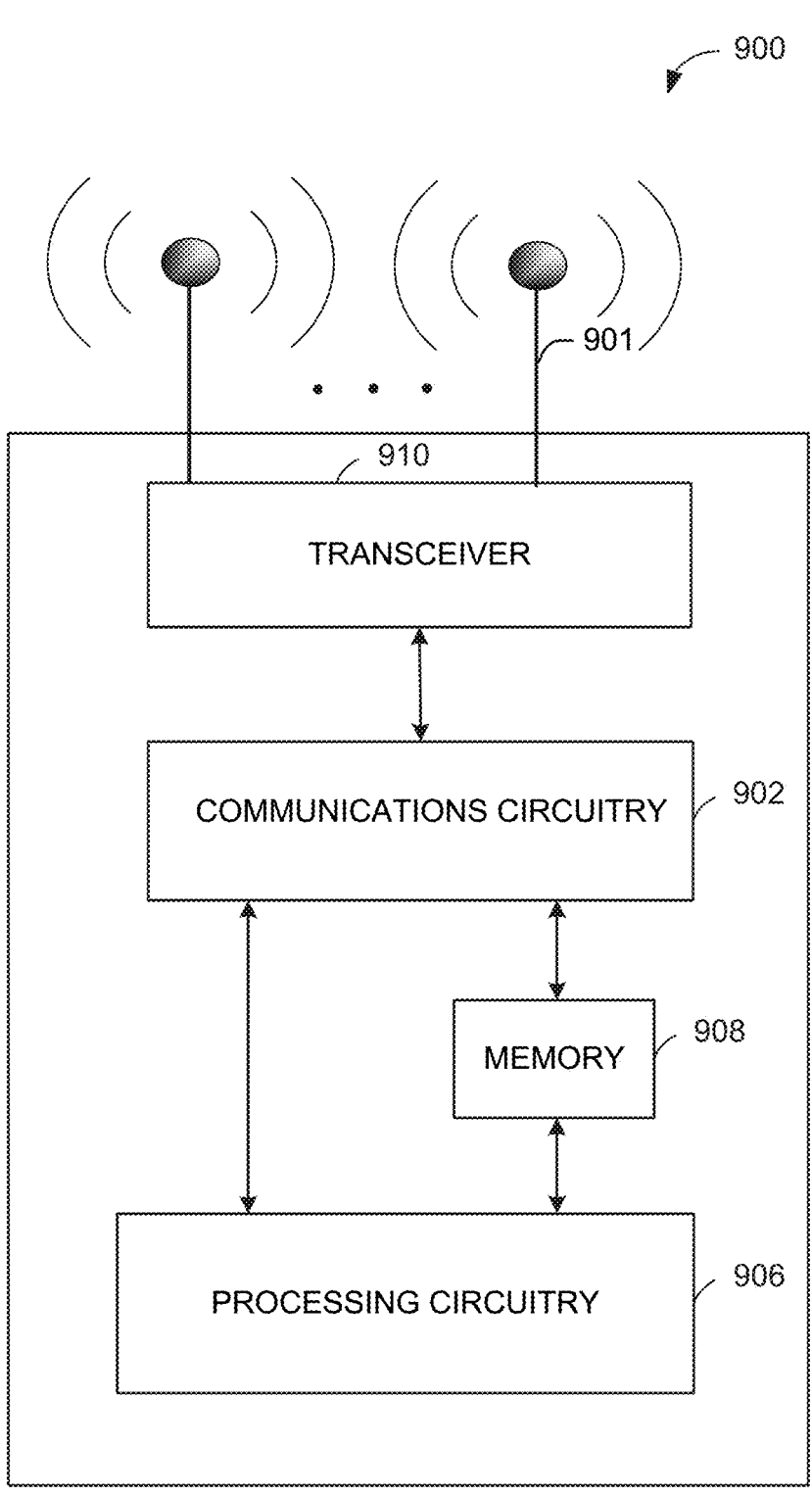
FIG. 9 illustrates a functional diagram of an exemplary communication station that may be suitable for use as a user device, in accordance with one or more example embodiments of the present disclosure.
Figure 10:
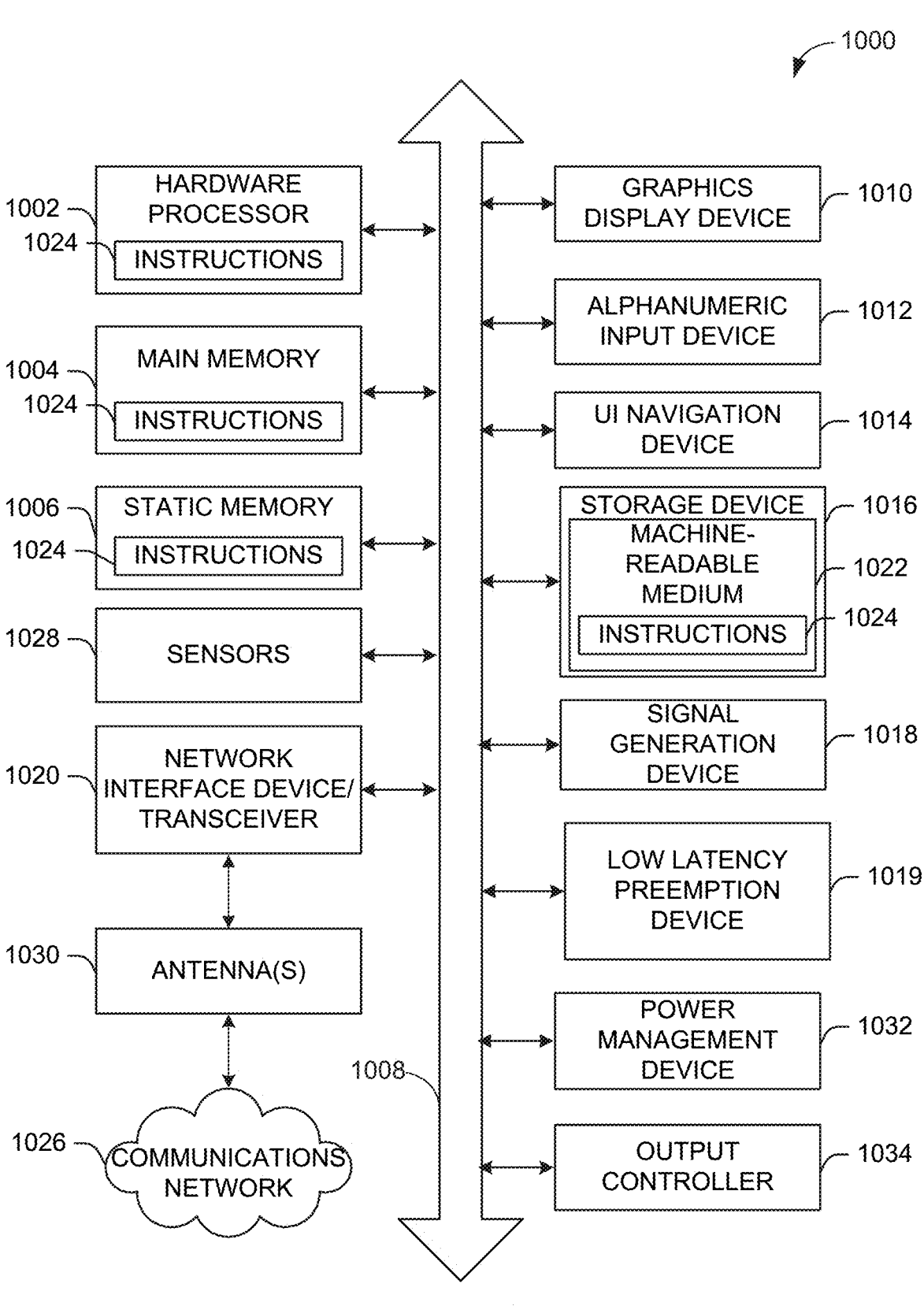
FIG. 10 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 9 and/or the example machine/system of FIG. 10.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single address-able unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultra-book™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically compos-able computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio ampli-fier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit informa-tion to one or more other devices over a wired or wireless connection. An IoT device may have a passive communi-cation interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable com-munications interface for communicating with the IoT net-work. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accor-dance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable commu-nications networks such as, for example, broadcasting net-works, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communica-tions networks 130 and/or 135 may include any type of medium over which network traffic may be carried includ-ing, but not limited to, coaxial cable, twisted-pair wire, optical fiber, a hybrid fiber coaxial (HFC) medium, micro-wave terrestrial transceivers, radio frequency communica-tion mediums, white space communication mediums, ultra-high frequency communication mediums, satellite communication mediums, or any combination thereof.

Any of the user device(s) 120 (e.g., user devices 124, 126, 128) and AP(s) 102 may include one or more communica-tions antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electron-ics Engineers (IEEE) 802.11 family of standards compatible antennas, directional antennas, non-directional antennas, dipole antennas, folded dipole antennas, patch antennas, multiple-input multiple-output (MIMO) antennas, omnidi-rectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax, 802.11be, etc.), 6 GHz channels (e.g., 802.11ax, 802.11be, etc.), or 60 GHZ channels (e.g. 802.11ad, 802.11ay). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, a user device 120 may be in communication with one or more APs 102. For example, one or more APs 102 may implement a low latency preemption 142 with one or more user devices 120. The one or more APs 102 may be multi-link devices (MLDs) and the one or more user device 120 may be non-AP MLDs. Each of the one or more APs 102 may comprise a plurality of individual APs (e.g., AP1, AP2, APn, where n is an integer) and each of the one or more user devices 120 may comprise a plurality of individual STAs (e.g., STA1, STA2, STAn). The AP MLDs and the non-AP MLDs may set up one or more links (e.g., Link1, Link2, Linkn) between each of the individual APs and STAs. It is understood that the above descriptions are for the purposes of illustration and are not meant to be limiting.

FIGS. 2-7 depict illustrative schematic diagrams for low latency preemption, in accordance with one or more example embodiments of the present disclosure.

The problem can be summarized by two main cases (Case A and Case B below).

Figure 2:
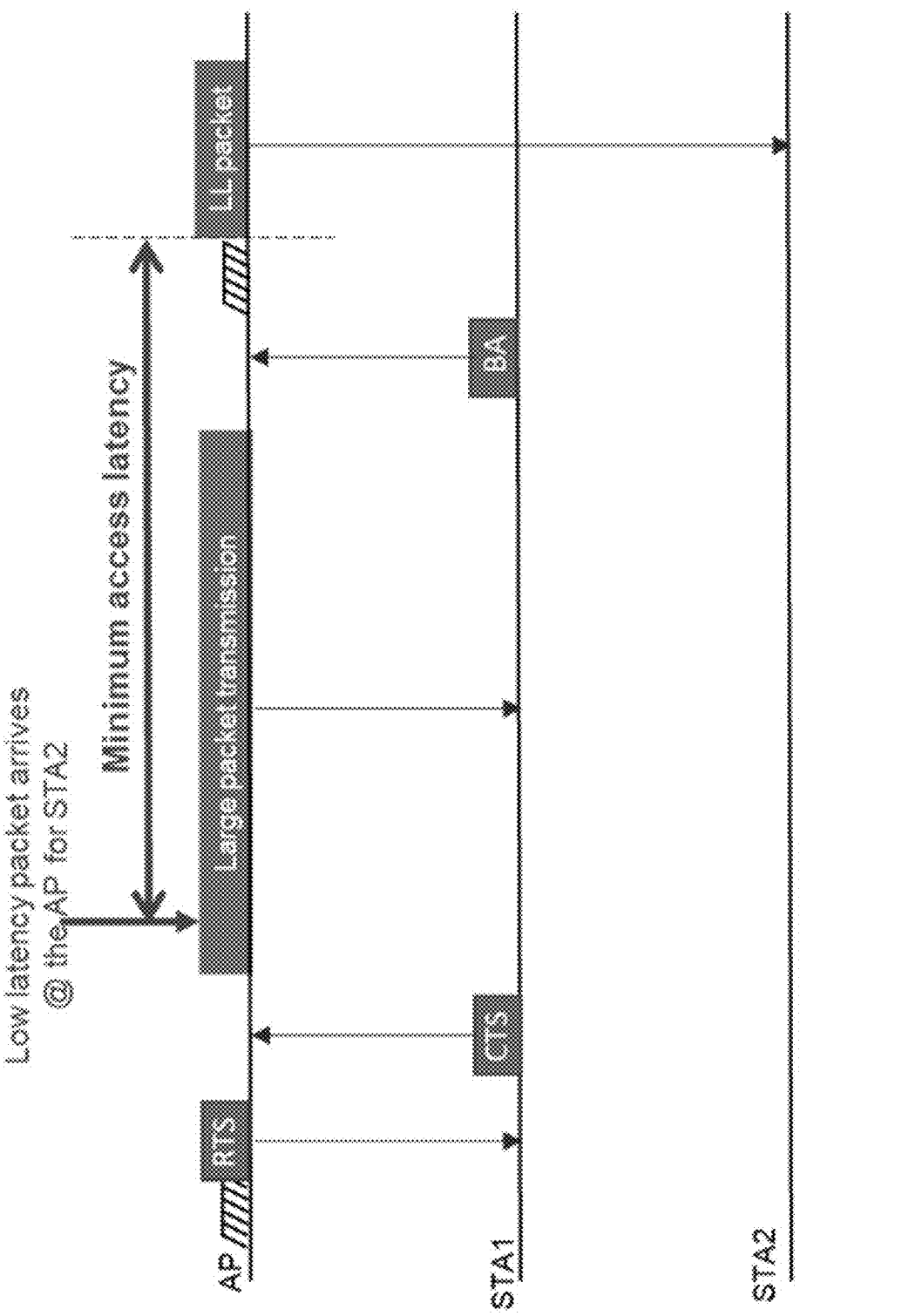

Case A: The low latency (LL) transmitter is the TXOP holder or TXOP responder, as shown in FIG. 2 once the AP obtains the channel, it can start a long DL PPDU transmission. If later a LL packet arrives at the AP for another STA, the AP needs to wait until the end of the current DL transmission to send the LL packet, which will lead to a large delay in the LL application. Several preemption ideas have been suggested as solutions for this problem, as outlined below:

1) OFDM symbol level preemption.

Figure 3:
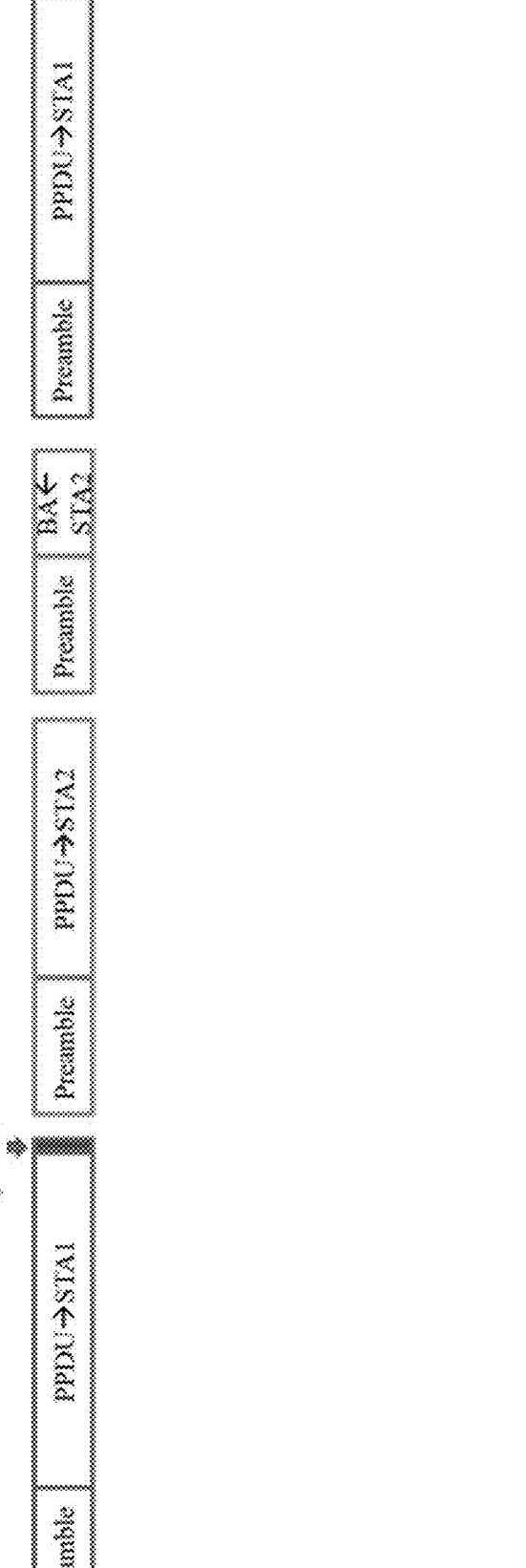

FIG. 3 shows LL application's OFDM symbol-level preemption. The TXOP holder or responder can terminate PPDU transmission early and send the LL packet.

2) MPDU level preemption with multiple RA A-MPDU.

FIG. 4 shows multiple RA AMPDU. As shown in the FIG. 4, the TXOP holder or responder can insert LL MPDU for another receiver by using multiple RA A-MPDU format.

Case B: The low latency transmitter is not the TXOP holder or responder.

Figure 5:
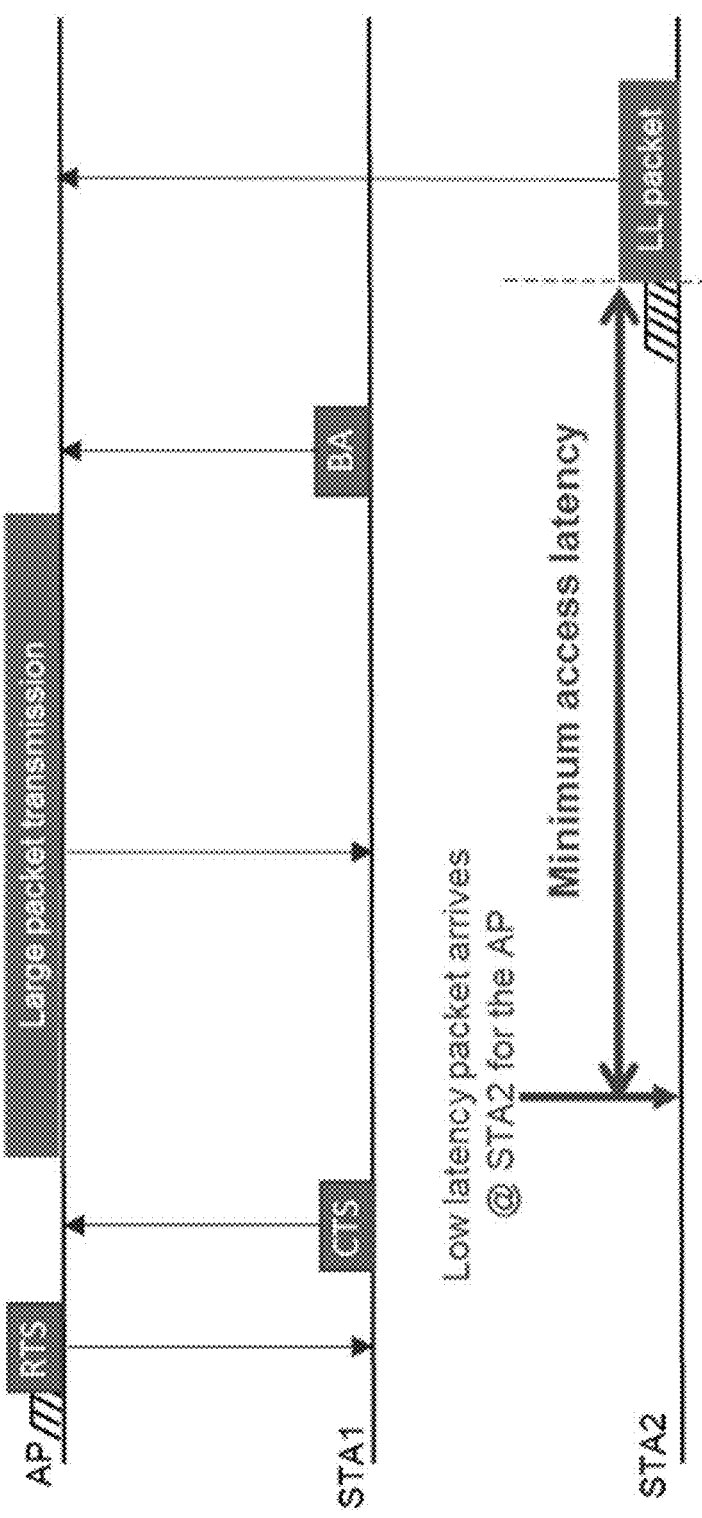

FIG. 5 shows that in this scenario the LL transmitter is not the TXOP holder or responder.

As shown in FIG. 5, if the LL transmitter is not the TXOP holder or responder, it needs to wait until the end of the PPDU exchange to access the medium for LL transmission.

It was also proposed to divide the long data PPDU into multiple small PPDUs with maximum PPDU length limitation and provide time gaps between two continuous PPDUs to enable preemption opportunity for LL transmission with different xIFS channel access.

In one or more embodiments, a low latency preemption system may use the null tones for the LL transmitter to send the suspend/resource request (SR).

In one or more embodiments, a low latency preemption system may apply for case when the AP is the TXOP holder and use the TXOP for DL PPDU transmission or UL trigger based PPDU transmission. It also works for the case when the STA is the TXOP holder and uses the TXOP for UL PPDU transmission.

AP STA's Behaviors:
1) An AP shall set the suspend request (SR) feedback report support subfield in the UHR capabilities element to 1 if it supports the SR feedback report and set it to 0 otherwise. If the AP supports the SR feedback report, it has the capability to detect the SR over the null tone and trigger the LL STA.
2) An AP may include the SR feedback report parameter set element in Beacon frames, Probe Response frames, and (Re) Association Response frames in order to modify parameters for SR Feedback Report operation.

3) An AP may Indicate whether the current TXOP is preemptable or not in the first control frame sent by the AP.

4) An AP may select and indicate which non-AP STAs are allowed to send the SR over the predefined null tone set.

5) An AP may define the maximum PPDU length limitation.

It should be noted that the null tone set used for the SR feedback is predefined and known to both AP and STAs. Table 1 indicates the number of available null tones that can be used to transmit the suspend request. Table 2 shows a fixed null tone set for suspend request transmission, which simplifies the design. Phase differentiation may be used at the receiver side to detect the SR if the opposite value, ±1, is set in two continuous null tones. Power differentiation may be used at the receiver side to detect the SR if two continuous null tones are set to 1 and 0 as shown in Table 2. Multiple null tone sets over the frequency domain, such as N sets, may be available while the bandwidth is wider. Each set can further be encoded by an M×M P-matrix over multiple OFDM symbols in the time domain. A P-matrix, or positive definite matrix, is a square matrix where all of its eigenvalues are positive. As a result, NM mappings can be used to support NM groups of LL STAs or NM individual LL STAs. Both time domain and frequency domain extensions can be used individually and jointly.

TABLE 1

| Number of available null tones for suspend request feedback. | | |
|---|---|---|
| | OFDMA null tones | Non-OFDMA null tones |
| 80 MHz PPDU | 18DC + 10 nulls = 28 Nulls | N/A |
| 160 MHz PPDU | 46 Nulls + 18DC + 20 Nulls = 84 Nulls | 18 DC + 10 Nulls = 28 Nulls |
| 320 MHz PPDU | 138 Nulls + 18DC + 40 Nulls = 196 Nulls | 46 Nulls + 18 DC + 20 Nulls = 84 Nulls |

TABLE 2

| Channel Width | Null subcarriers index used for suspend request | description |
|---|---|---|
| 80 MHz OFDMA transmission | ±254, ±255, ±257, ±258, ±11: ±5 | Set ±254, ±257, ±11, ±9, ±7, ±5 be to 1 and ±255, ±258, ±10, ±8, ±6, ±4 be to 0 or −1 while suspend request is sent |
| 160 MHz | ±510, ±511, ±513, ±514, ±11: ±5 | Set ±510, ±513, ±11, ±9, ±7, ±5 be to 1 and ±511, ±514, ±10, ±8, ±6, ±4 be to 0 or −1 while suspend request is sent |
| 320 MHz | Null tone set over the primary 160 MHz channel | above |

Non-AP STA's Behaviors:

1) A non-AP STA shall set the SR feedback Report Support subfield in the UHR capabilities element to 1 if it supports the SR feedback report and set it to 0 or −1, otherwise.

2) Check whether the current TXOP is preemptable or not based on the first control frame sent by the AP STA.

3) Check whether it is allowed to do preemption and which null tone set it can use to send the suspend request.

Note: The AP may assign one or more dedicated RUs for the LL STA to send suspend request frame.

4) Follow the maximum PPDU length limitation set by the AP STA.

Figure 6A:
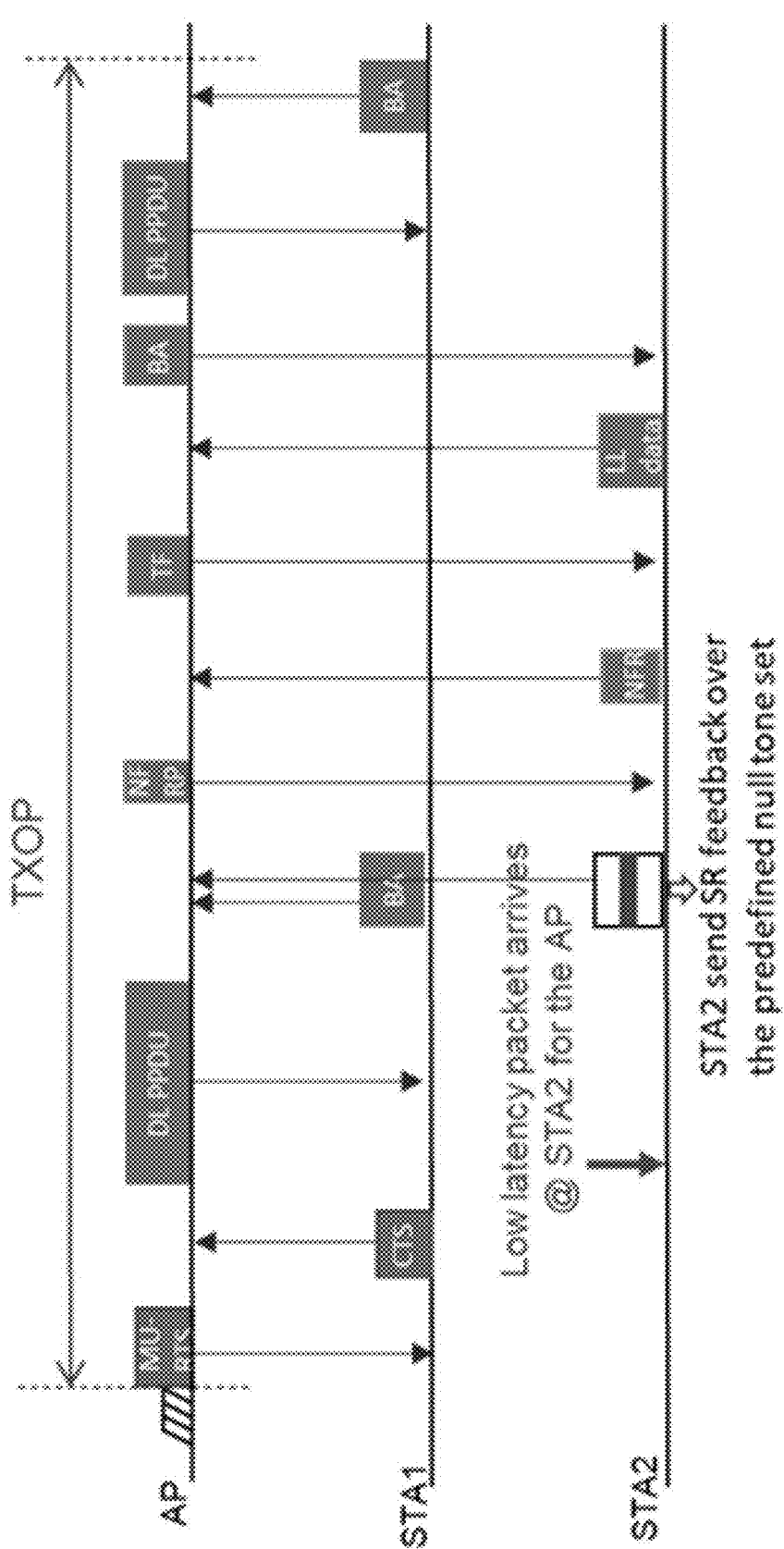
Figure 6B:
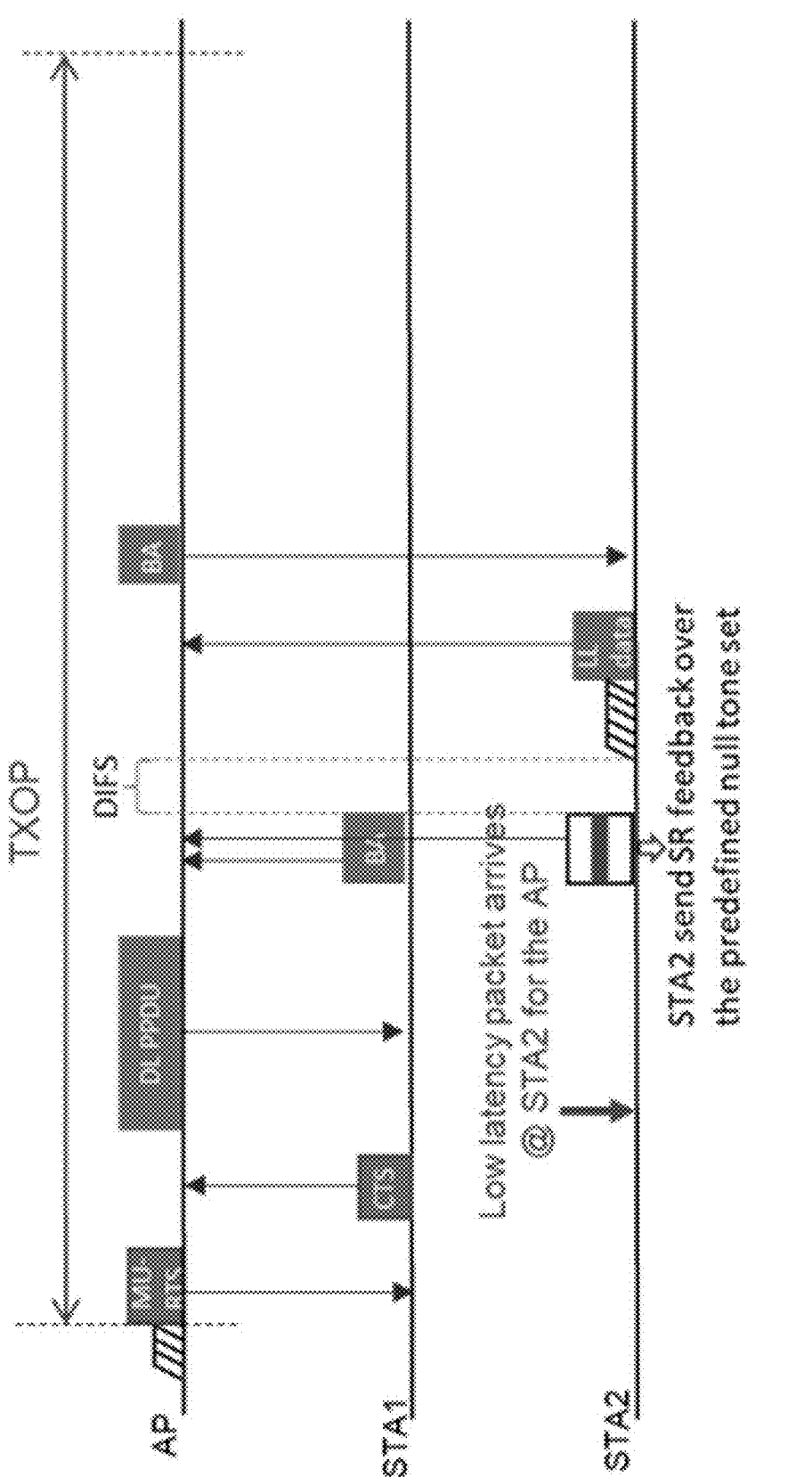

Referring to FIG. 6A, there is shown Approach A for downlink (DL) case and FIG. 6B shows Approach B for DL case.

As shown in FIGS. 6A and 6B, the long TXOP DL transmission is divided into multiple DL PPDU/BA exchange. If it is DL MU PPDU, there will be an MU-BAR sent by the AP following the DL MU PPDU before the BA and SR. The maximum length of each DL PPDU will be designed based on the latency requirement of the LL application. The enhanced MU-RTS frame will indicate whether the current TXOP is preemptable or not;

Upon reception of the enhanced MU-RTS frame, if the non-AP STAs including the receiver of MU-RTS frame, such as STA1 in thi s example, have LL packet to be sent, they can send suspend request (SR) feedback frame over the predefined null tone set SIFS time after the reception of the MU-RTS or DL PPDU frame. Upon detection of the SR over the null tone set according to Table 2, the AP may suspend the following DL PPDU transmission, and:

may send an NDP feedback report poll (NFRP) frame to trigger the LL STAs to feedback the buffer status report for the low latency application. Upon the reception of the NRF from the LL STAs, the AP can send a trigger frame to trigger the LL STAs to send a UL LL packet. After the LL/BA exchange between the AP and the LL STA, the AP can resume the DL PPDU transmission as shown in FIG. 6A or terminate the current TXOP and re-access the channel for a new TXOP transmission.

may early terminate the TXOP. If the channel is idle for DIFS time after the end of the SR frame transmission, the LL STA may resume the backoff procedure to access the channel for LL packet transmission as shown in FIG. 6B.

Note that during the DL PPDU transmission, if the AP has a LL packet to be transmitted to a LL STA, it can transmit the LL packet in the next DL PPDU.

Figure 7:
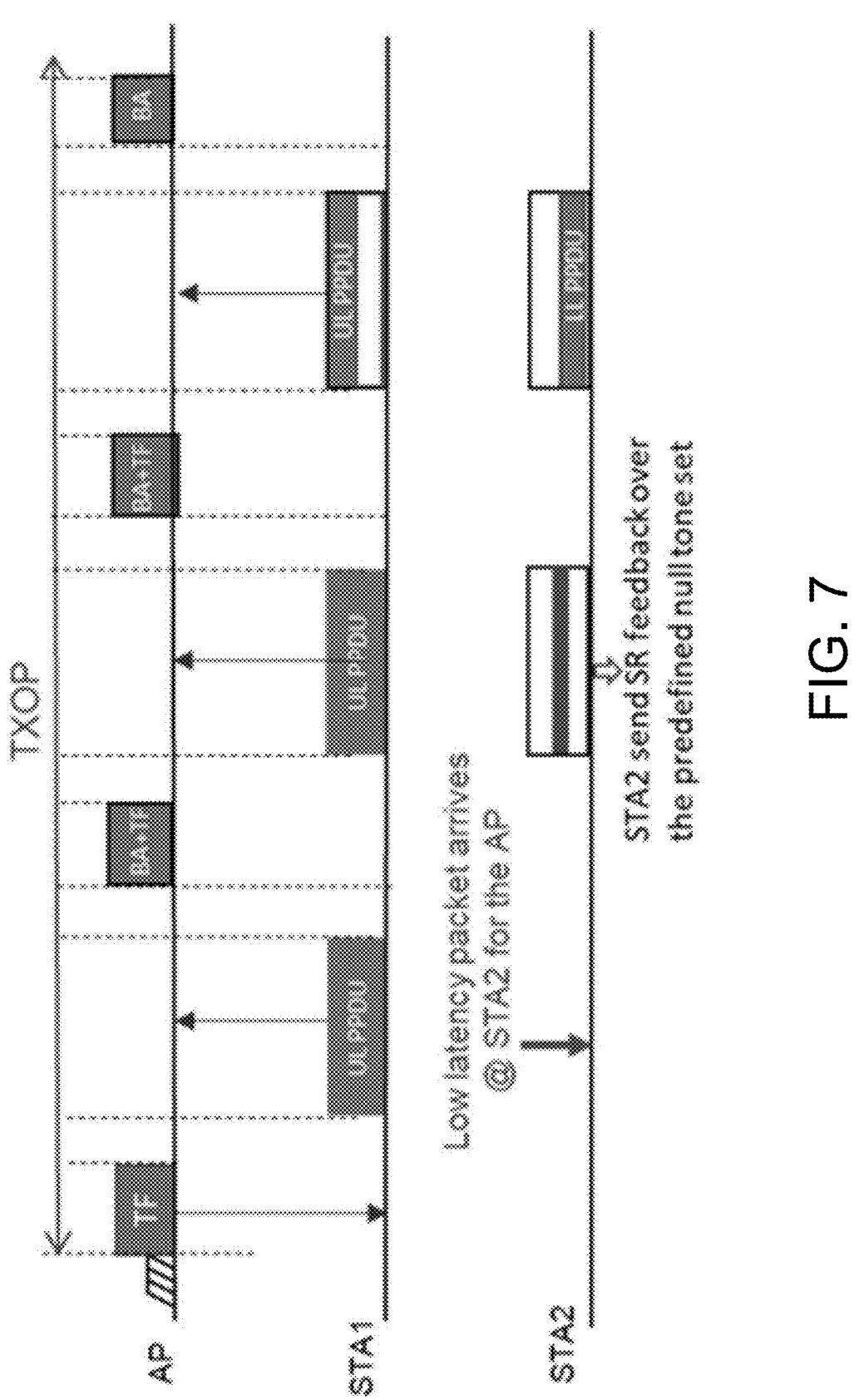

FIG. 7 shows the uplink (UL) case. As shown in FIG. 7, the long TXOP UL TB PPDU and BA exchange between the AP and the STA is divided into multiple PPDU/BA exchanges. To reduce the overhead, the BA for the previous UL PPDU and trigger frame for the next UL PPDU can be integrated into a single frame if needed. The maximum length of each UL PPDU/BA exchange will be designed based on the latency requirement of the LL application. The first trigger frame (TF) frame will indicate whether the current TXOP is preemptable or not;

Upon the reception of the TF, if the LL transmitters have LL packet to be sent, they can send an SR frame over the predefined null tone set SIFS time after the reception of the TF or aggerated BA+TF frame. SIFS time after the reception of the SR frame integrated with the UL PPDU frame, the AP may trigger the LL STAs to send the UL LL PPDU in the next TB UL PPDU as shown in FIG. 7.

Note that in the aggregated BA and TF frame, AP may only trigger the UL LL STA to send UL LL frame after the reception of the previous UL PPDU.

During the TXOP, if the AP has LL packet for another STA or the same STA, it can integrate it with the BA, or integrate the LL packet in next aggregated BA+TF frame, or send it separately following the next BA sent to the non-LL STA. The AP can resume the UL trigger based PPDU transmission after the DL LL/BA exchange or early terminate the current TXOP and re-access the medium for a new TXOP.

The null tone may also include the guard tone and/or DC tone.

Figure 8:
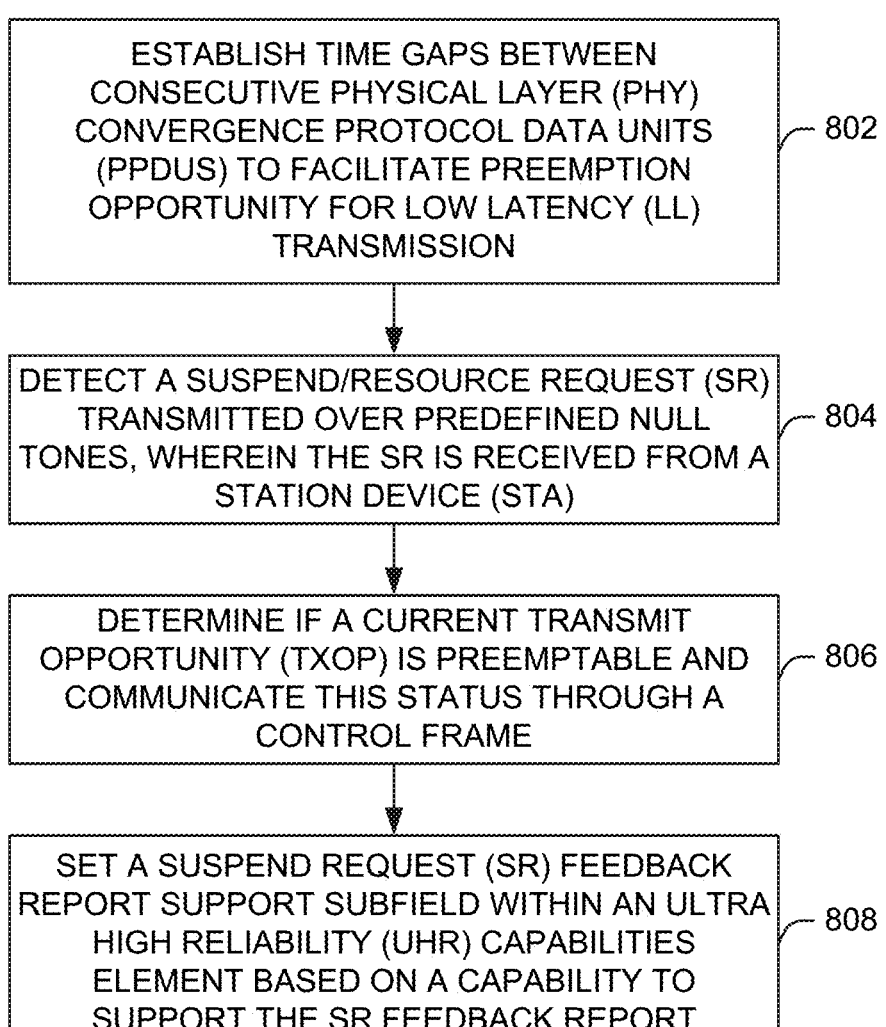
FIG. 8 illustrates a flow diagram of a process for an illustrative low latency preemption system, in accordance with one or more example embodiments of the present disclosure.

FIG. 8 illustrates a flow diagram of illustrative process 800 for a low latency preemption system, in accordance with one or more example embodiments of the present disclosure.

At block 802, a device (e.g., the user device(s) 120 and/or the AP 102 of FIG. 1 and/or the low latency preemption device 1019 of FIG. 10) may establish time gaps between consecutive physical layer (PHY) convergence protocol data units (PPDUs) to facilitate preemption opportunity for low latency (LL) transmission.

At block 804, the device may detect a suspend/resource request (SR) transmitted over predefined null tones, wherein the SR is received from a station device (STA).

At block 806, the device may determine if a current transmit opportunity (TXOP) is preemptable and communicate this status through a control frame.

At block 808, the device may set a suspend request (SR) feedback report support subfield within an ultra high reliability (UHR) capabilities element based on a capability to support the SR feedback report.

The device may utilize predefined null tones that are known to both an AP and STAs. The device may include an SR feedback report parameter set element in one or more types of frames, specifically Beacon frames, Probe Response frames, and (Re) Association Response frames. Additionally, the device may indicate which STAs are permitted to transmit the SR over the predefined null tones. The device may also set a maximum PPDU length limitation for the purpose of transmitting data. On the receiver side, the device may employ power differentiation for SR detection, which is based on values set in two continuous null tones. Upon detecting an SR over these predefined null tones, the device, acting as an AP, may suspend the following DL PPDU transmission and either trigger an LL STA to provide feedback on buffer status or prompt the LL STA to send an uplink LL packet. Furthermore, the device may offer multiple null tone sets across a frequency domain that are available for SR transmission; each set may be encoded by a P-matrix over multiple OFDM symbols in a time domain. Finally, the device may transmit an LL packet in the next DL PPDU if that LL packet is intended for an LL STA during the transmission of a next DL PPDU.

It is understood that the above descriptions are for the purposes of illustration and are not meant to be limiting.

FIG. 9 shows a functional diagram of an exemplary communication station 900, in accordance with one or more example embodiments of the present disclosure. In one embodiment, FIG. 9 illustrates a functional block diagram of a communication station that may be suitable for use as an AP 102 (FIG. 1) or a user device 120 (FIG. 1) in accordance with some embodiments. The communication station 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 900 may include communications circuitry 902 and a transceiver 910 for transmitting and receiving signals to and from other communication stations using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), a low latency preemption device 1019, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1002 for generation and processing of the baseband signals and for controlling operations of the main memory 1004, the storage device 1016, and/or the low latency preemption device 1019. The baseband processor may be provided on a single radio card, a single chip, or an integrated circuit (IC).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The low latency preemption device 1019 may carry out or perform any of the operations and processes (e.g., process 800) described and shown above.

It is understood that the above are only a subset of what the low latency preemption device 1019 may be configured to perform and that other functions included throughout this disclosure may also be performed by the low latency preemption device 1019.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 11:
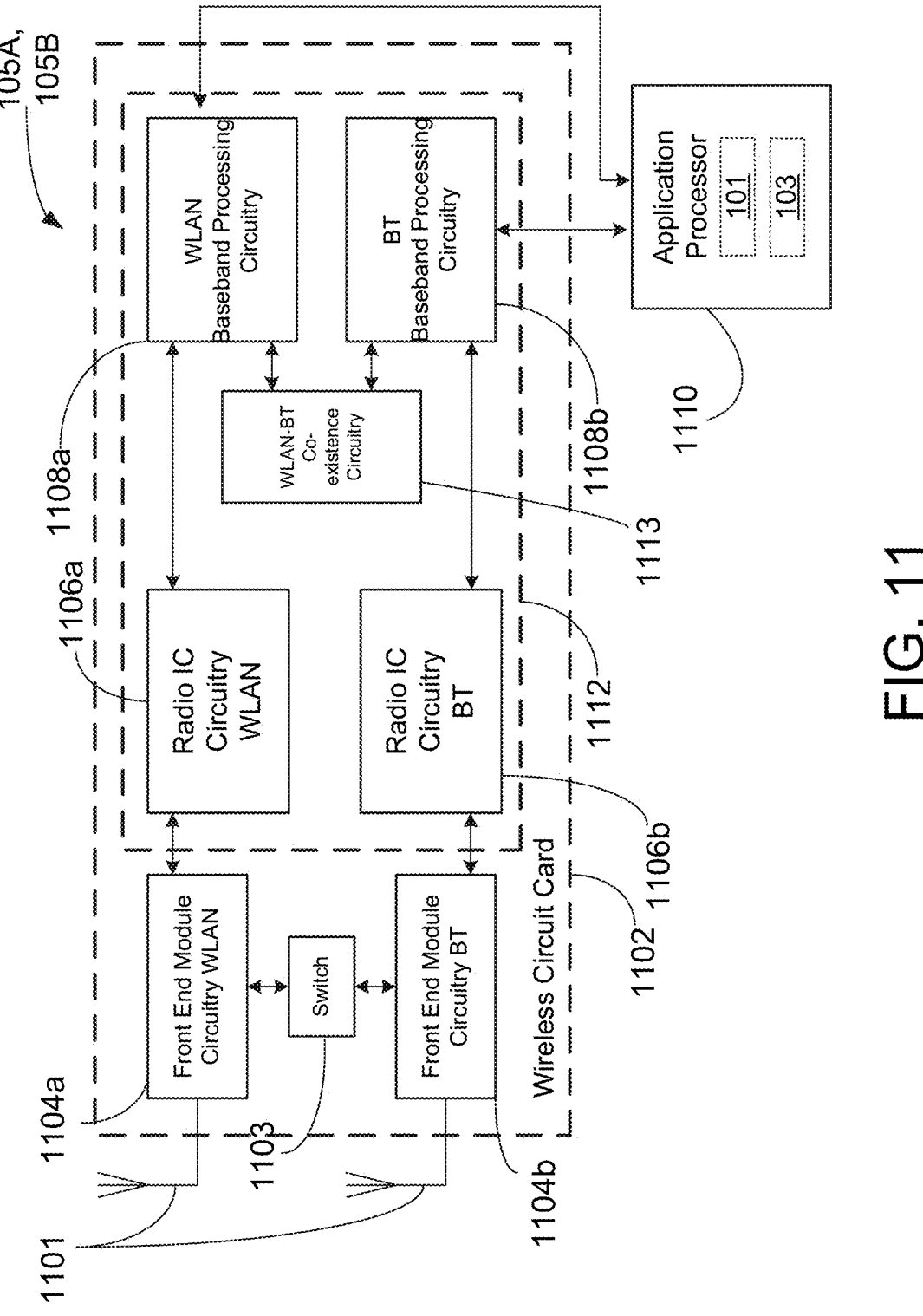
FIG. 11 is a block diagram of a radio architecture in accordance with some examples.

FIG. 11 is a block diagram of a radio architecture 105A, 105B in accordance with some embodiments that may be implemented in any one of the example APs 102 and/or the example STAs 120 of FIG. 1. Radio architecture 105A, 105B may include radio front-end module (FEM) circuitry 1104*a-b*, radio IC circuitry 1106*a-b* and baseband processing circuitry 1108*a-b*. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1104*a-b* may include a WLAN or Wi-Fi FEM circuitry 1104*a* and a Bluetooth (BT) FEM circuitry 1104*b*. The WLAN FEM circuitry 1104*a* may include a receive signal path comprising circuitry configured to operate on WLAN RF signals received from one or more antennas 1101, to amplify the received signals and to provide the amplified versions of the received signals to the WLAN radio IC circuitry 1106*a* for further processing. The BT FEM circuitry 1104*b* may include a receive signal path which may include circuitry configured to operate on BT RF signals received from one or more antennas 1101, to amplify the received signals and to provide the amplified versions of the received signals to the BT radio IC circuitry 1106*b* for further processing. FEM circuitry 1104*a* may also include a transmit signal path which may include circuitry configured to amplify WLAN signals provided by the radio IC circuitry 1106*a* for wireless transmission by one or more of the antennas 1101. In addition, FEM circuitry 1104*b* may also include a transmit signal path which may include circuitry configured to amplify BT signals provided by the radio IC circuitry 1106*b* for wireless transmission by the one or more antennas. In the embodiment of FIG. 11, although FEM 1104*a* and FEM 1104*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106*a-b* as shown may include WLAN radio IC circuitry 1106*a* and BT radio IC circuitry 1106*b*. The WLAN radio IC circuitry 1106*a* may include a receive signal path which may include circuitry to down-convert WLAN RF signals received from the FEM circuitry 1104*a* and provide baseband signals to WLAN baseband processing circuitry 1108*a*. BT radio IC circuitry 1106*b* may in turn include a receive signal path which may include circuitry to down-convert BT RF signals received from the FEM circuitry 1104*b* and provide baseband signals to BT baseband processing circuitry 1108*b*. WLAN radio IC circuitry 1106*a* may also include a transmit signal path which may include circuitry to up-convert WLAN baseband signals provided by the WLAN baseband processing circuitry 1108*a* and provide WLAN RF output signals to the FEM circuitry 1104a for subsequent wireless transmission by the one or more antennas 1101. BT radio IC circuitry 1106b may also include a transmit signal path which may include circuitry to up-convert BT baseband signals provided by the BT baseband processing circuitry 1108b and provide BT RF output signals to the FEM circuitry 1104b for subsequent wireless transmission by the one or more antennas 1101. In the embodiment of FIG. 11, although radio IC circuitries 1106a and 1106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1108a-b may include a WLAN baseband processing circuitry 1108a and a BT baseband processing circuitry 1108b. The WLAN baseband processing circuitry 1108a may include a memory, such as, for example, a set of RAM arrays in a Fast Fourier Transform or Inverse Fast Fourier Transform block (not shown) of the WLAN baseband processing circuitry 1108a. Each of the WLAN baseband circuitry 1108a and the BT baseband circuitry 1108b may further include one or more processors and control logic to process the signals received from the corresponding WLAN or BT receive signal path of the radio IC circuitry 1106a-b, and to also generate corresponding WLAN or BT baseband signals for the transmit signal path of the radio IC circuitry 1106a-b. Each of the baseband processing circuitries 1108a and 1108b may further include physical layer (PHY) and medium access control layer (MAC) circuitry, and may further interface with a device for generation and processing of the baseband signals and for controlling operations of the radio IC circuitry 1106a-b.

Referring still to FIG. 11, according to the shown embodiment, WLAN-BT coexistence circuitry 1113 may include logic providing an interface between the WLAN baseband circuitry 1108a and the BT baseband circuitry 1108b to enable use cases requiring WLAN and BT coexistence. In addition, a switch 1103 may be provided between the WLAN FEM circuitry 1104a and the BT FEM circuitry 1104b to allow switching between the WLAN and BT radios according to application needs. In addition, although the antennas 1101 are depicted as being respectively connected to the WLAN FEM circuitry 1104a and the BT FEM circuitry 1104b, embodiments include within their scope the sharing of one or more antennas as between the WLAN and BT FEMs, or the provision of more than one antenna connected to each of FEM 1104a or 1104b.

In some embodiments, the front-end module circuitry 1104a-b, the radio IC circuitry 1106a-b, and baseband processing circuitry 1108a-b may be provided on a single radio card, such as wireless radio card 1102. In some other embodiments, the one or more antennas 1101, the FEM circuitry 1104a-b and the radio IC circuitry 1106a-b may be provided on a single radio card. In some other embodiments, the radio IC circuitry 1106a-b and the baseband processing circuitry 1108a-b may be provided on a single chip or integrated circuit (IC), such as IC 1112.

In some embodiments, the wireless radio card 1102 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1108b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 12:
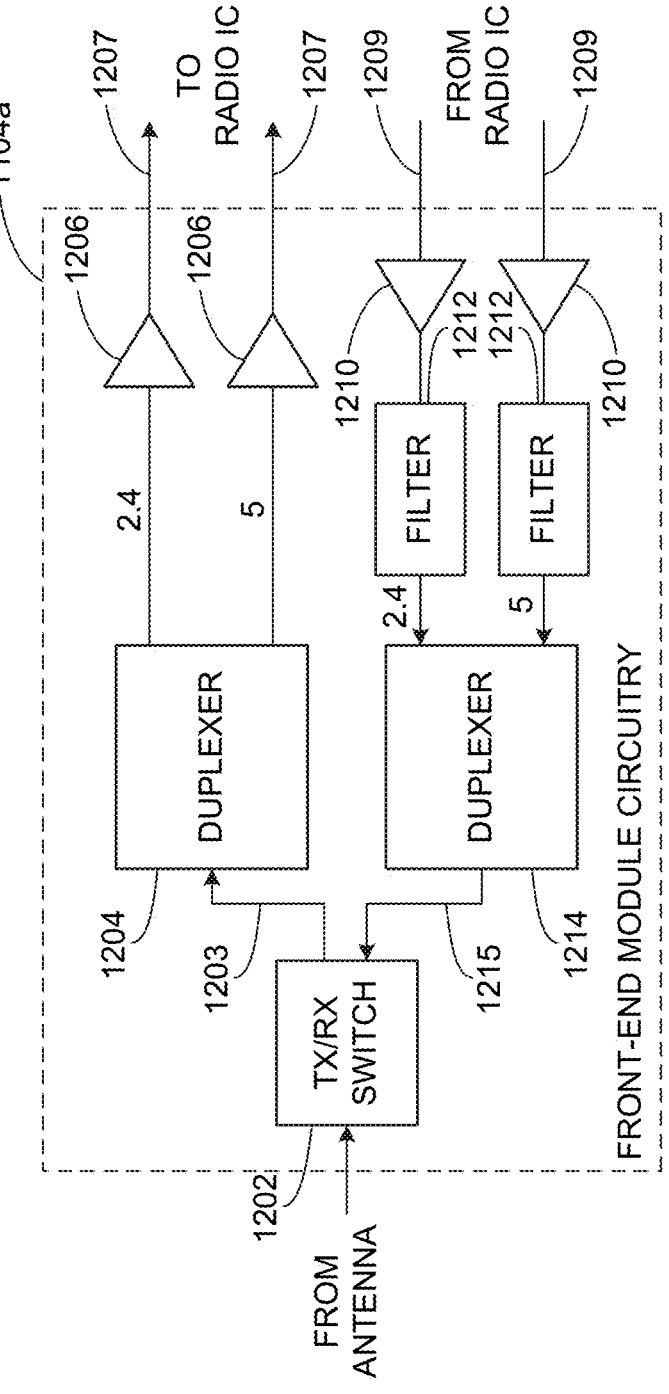
FIG. 12 illustrates an example front-end module circuitry for use in the radio architecture of FIG. 11, in accordance with one or more example embodiments of the present disclosure.

FIG. 12 illustrates WLAN FEM circuitry 1104a in accordance with some embodiments. Although the example of FIG. 12 is described in conjunction with the WLAN FEM circuitry 1104a, the example of FIG. 12 may be described in conjunction with the example BT FEM circuitry 1104b (FIG. 11), although other circuitry configurations may also be suitable.

In some embodiments, the FEM circuitry 1104a may include a TX/RX switch 1202 to switch between transmit mode and receive mode operation. The FEM circuitry 1104*a* may include a receive signal path and a transmit signal path. The receive signal path of the FEM circuitry 1104*a* may include a low-noise amplifier (LNA) 1206 to amplify received RF signals 1203 and provide the amplified received RF signals 1207 as an output (e.g., to the radio IC circuitry 1106*a*-*b* (FIG. 11)). The transmit signal path of the circuitry 1104*a* may include a power amplifier (PA) to amplify input RF signals 1209 (e.g., provided by the radio IC circuitry 1106*a*-*b*), and one or more filters 1212, such as band-pass filters (BPFs), low-pass filters (LPFs) or other types of filters, to generate RF signals 1215 for subsequent transmission (e.g., by one or more of the antennas 1101 (FIG. 11)) via an example duplexer 1214.

In some dual-mode embodiments for Wi-Fi communication, the FEM circuitry 1104*a* may be configured to operate in either the 2.4 GHz frequency spectrum or the 5 GHz frequency spectrum. In these embodiments, the receive signal path of the FEM circuitry 1104*a* may include a receive signal path duplexer 1204 to separate the signals from each spectrum as well as provide a separate LNA 1206 for each spectrum as shown. In these embodiments, the transmit signal path of the FEM circuitry 1104*a* may also include a power amplifier 1210 and a filter 1212, such as a BPF, an LPF or another type of filter for each frequency spectrum and a transmit signal path duplexer 1204 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104*a* as the one used for WLAN communications.

Figure 13:
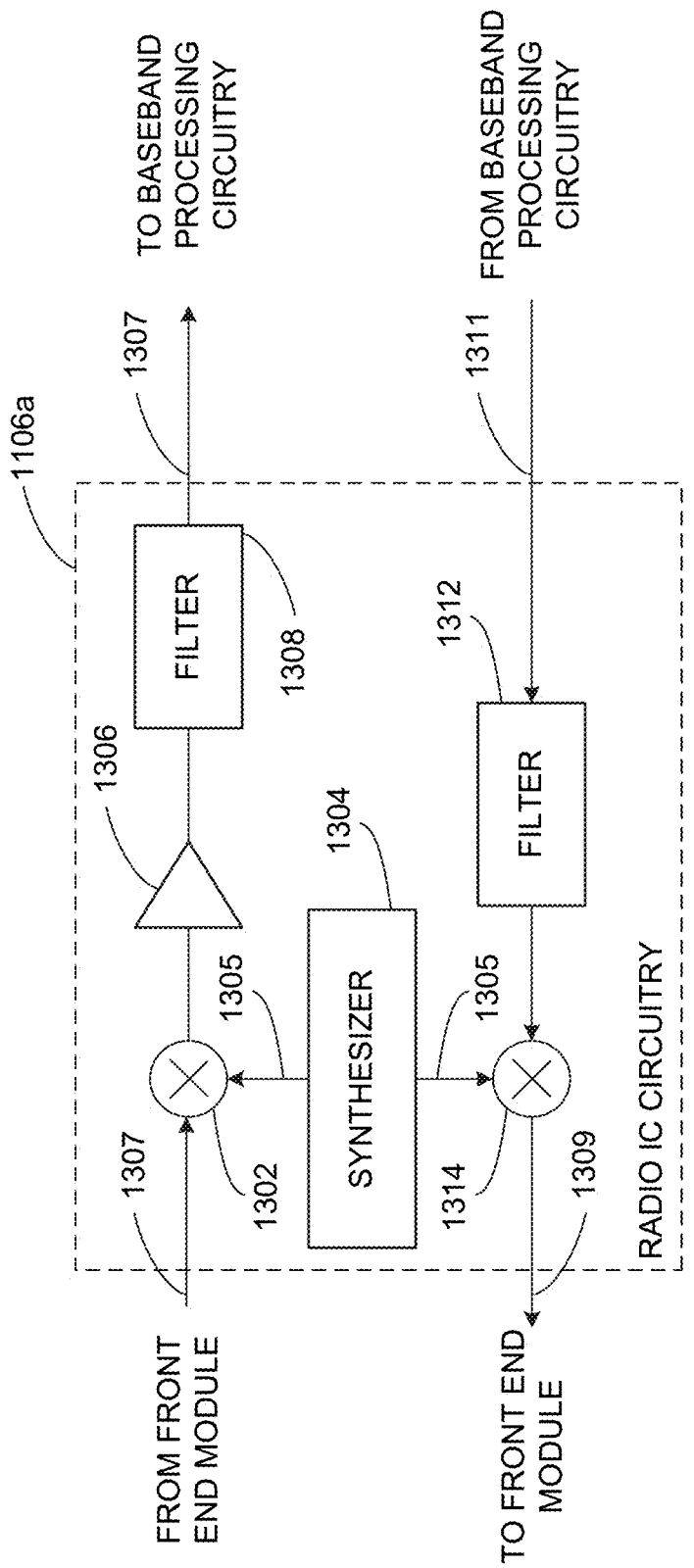
FIG. 13 illustrates an example radio IC circuitry for use in the radio architecture of FIG. 11, in accordance with one or more example embodiments of the present disclosure.

FIG. 13 illustrates radio IC circuitry 1106*a* in accordance with some embodiments. The radio IC circuitry 1106*a* is one example of circuitry that may be suitable for use as the WLAN or BT radio IC circuitry 1106*a*/1106*b* (FIG. 11), although other circuitry configurations may also be suitable. Alternatively, the example of FIG. 13 may be described in conjunction with the example BT radio IC circuitry 1106*b*.

In some embodiments, the radio IC circuitry 1106*a* may include a receive signal path and a transmit signal path. The receive signal path of the radio IC circuitry 1106*a* may include at least mixer circuitry 1302, such as, for example, down-conversion mixer circuitry, amplifier circuitry 1306 and filter circuitry 1308. The transmit signal path of the radio IC circuitry 1106*a* may include at least filter circuitry 1312 and mixer circuitry 1314, such as, for example, up-conversion mixer circuitry. Radio IC circuitry 1106*a* may also include synthesizer circuitry 1304 for synthesizing a frequency 1305 for use by the mixer circuitry 1302 and the mixer circuitry 1314. The mixer circuitry 1302 and/or 1314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, embodiments where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some embodiments, mixer circuitry 1302 may be configured to down-convert RF signals 1207 received from the FEM circuitry 1104*a*-*b* (FIG. 11) based on the synthesized frequency 1305 provided by synthesizer circuitry 1304. The amplifier circuitry 1306 may be configured to amplify the down-converted signals and the filter circuitry 1308 may include an LPF configured to remove unwanted signals from the down-converted signals to generate output baseband signals 1307. Output baseband signals 1307 may be provided to the baseband processing circuitry 1108*a*-*b* (FIG. 11) for further processing. In some embodiments, the output baseband signals 1307 may be zero-frequency baseband signals, although this is not a requirement. In some embodiments, mixer circuitry 1302 may comprise passive mixers, although the scope of the embodiments is not limited in this respect.

In some embodiments, the mixer circuitry 1314 may be configured to up-convert input baseband signals 1311 based on the synthesized frequency 1305 provided by the synthesizer circuitry 1304 to generate RF output signals 1209 for the FEM circuitry 1104*a*-*b*. The baseband signals 1311 may be provided by the baseband processing circuitry 1108*a*-*b* and may be filtered by filter circuitry 1312. The filter circuitry 1312 may include an LPF or a BPF, although the scope of the embodiments is not limited in this respect.

In some embodiments, the mixer circuitry 1302 and the mixer circuitry 1314 may each include two or more mixers and may be arranged for quadrature down-conversion and/or up-conversion respectively with the help of synthesizer 1304. In some embodiments, the mixer circuitry 1302 and the mixer circuitry 1314 may each include two or more mixers each configured for image rejection (e.g., Hartley image rejection). In some embodiments, the mixer circuitry 1302 and the mixer circuitry 1314 may be arranged for direct down-conversion and/or direct up-conversion, respectively. In some embodiments, the mixer circuitry 1302 and the mixer circuitry 1314 may be configured for super-heterodyne operation, although this is not a requirement.

Mixer circuitry 1302 may comprise, according to one embodiment: quadrature passive mixers (e.g., for the in-phase (I) and quadrature phase (Q) paths). In such an embodiment, RF input signal 1207 from FIG. 13 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1305 of synthesizer 1304 (FIG. 13). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1207 (FIG. 12) may comprise a balanced signal, although the scope of the embodiments is not limited in this respect. The I and Q baseband output signals may be provided to low-noise amplifier, such as amplifier circuitry 1306 (FIG. 13) or to filter circuitry 1308 (FIG. 13).

In some embodiments, the output baseband signals 1307 and the input baseband signals 1311 may be analog baseband signals, although the scope of the embodiments is not limited in this respect. In some alternate embodiments, the output baseband signals 1307 and the input baseband signals 1311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1304 may be a fractional-N synthesizer or a fractional N/N+1 synthesizer, although the scope of the embodiments is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some embodiments, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1304 may be provided by a voltage controlled oscillator (VCO), although that is not a requirement. A divider control input may further be provided by either the baseband processing circuitry 1108*a-b* (FIG. 11) depending on the desired output frequency 1305. In some embodiments, a divider control input (e.g., N) may be determined from a look-up table (e.g., within a Wi-Fi card) based on a channel number and a channel center frequency as determined or indicated by the example application processor 1110. The application processor 1110 may include, or otherwise be connected to, one of the example secure signal converter 101 or the example received signal converter 103 (e.g., depending on which device the example radio architecture is implemented in).

In some embodiments, synthesizer circuitry 1304 may be configured to generate a carrier frequency as the output frequency 1305, while in other embodiments, the output frequency 1305 may be a fraction of the carrier frequency (e.g., one-half the carrier frequency, one-third the carrier frequency). In some embodiments, the output frequency 1305 may be a LO frequency (fLO).

Figure 14:
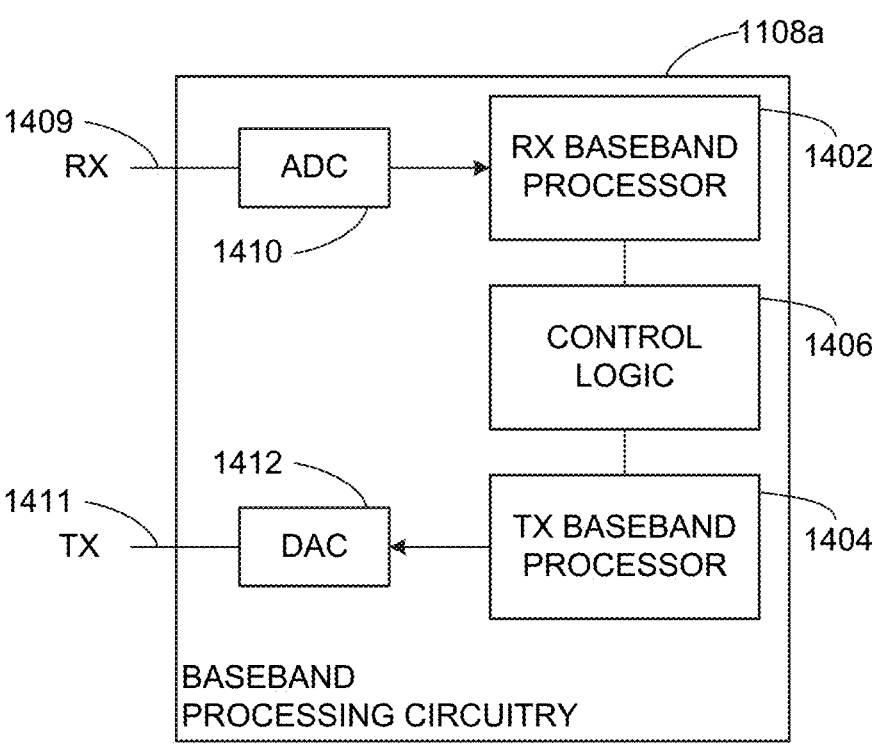
FIG. 14 illustrates an example baseband processing circuitry for use in the radio architecture of FIG. 11, in accordance with one or more example embodiments of the present disclosure.

FIG. 14 illustrates a functional block diagram of baseband processing circuitry 1108*a* in accordance with some embodiments. The baseband processing circuitry 1108*a* is one example of circuitry that may be suitable for use as the baseband processing circuitry 1108*a* (FIG. 11), although other circuitry configurations may also be suitable. Alternatively, the example of FIG. 13 may be used to implement the example BT baseband processing circuitry 1108*b* of FIG. 11.

The baseband processing circuitry 1108*a* may include a receive baseband processor (RX BBP) 1402 for processing receive baseband signals 1309 provided by the radio IC circuitry 1106*a-b* (FIG. 11) and a transmit baseband processor (TX BBP) 1404 for generating transmit baseband signals

1311 for the radio IC circuitry 1106*a-b*. The baseband processing circuitry 1108*a* may also include control logic 1406 for coordinating the operations of the baseband processing circuitry 1108*a*.

In some embodiments (e.g., when analog baseband signals are exchanged between the baseband processing circuitry 1108*a-b* and the radio IC circuitry 1106*a-b*), the baseband processing circuitry 1108*a* may include ADC 1410 to convert analog baseband signals 1409 received from the radio IC circuitry 1106*a-b* to digital baseband signals for processing by the RX BBP 1402. In these embodiments, the baseband processing circuitry 1108*a* may also include DAC 1412 to convert digital baseband signals from the TX BBP 1404 to analog baseband signals 1411.

In some embodiments that communicate OFDM signals or OFDMA signals, such as through baseband processor 1108*a*, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some embodiments, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some embodiments, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1101 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: establish time gaps between consecutive physical layer (PHY) convergence protocol data units (PPDUs) to facilitate preemption opportunity for low latency (LL) transmission; detect a suspend/resource request (SR) transmitted over predefined null tones, wherein the SR may be received from a station device (STA); determine if a current transmit opportunity (TXOP) may be preemptable and communicate this status through a control frame; and set a suspend request (SR) feedback report support subfield within an ultra high reliability (UHR) capabilities element based on a capability to support the SR feedback report.

Example 2 may include the device of example 1 and/or some other example herein, wherein the predefined null tones are predefined and known to both an AP and STAs.

Example 3 may include the device of example 1 and/or some other example herein, wherein the processing circuitry may be further configured to include an SR feedback report parameter set element in one or more of Beacon frames, Probe Response frames, and (Re) Association Response frames.

Example 4 may include the device of example 1 and/or some other example herein, wherein the processing circuitry may be further configured to indicate which STAs are permitted to transmit the SR over the predefined null tones.

Example 5 may include the device of example 1 and/or some other example herein, wherein the processing circuitry may be further configured to set a maximum PPDU length limitation for transmitting data.

Example 6 may include the device of example 1 and/or some other example herein, wherein the processing circuitry may be further configured to use power differentiation at a receiver side for SR detection based on values set in two continuous null tones.

Example 7 may include the device of example 1 and/or some other example herein, wherein upon detection of the SR over the predefined null tones, an AP suspends a following downlink (DL) PPDU transmission and triggers an LL station device (STA) to provide feedback on buffer status or triggers the LL STA to send an uplink LL packet.

Example 8 may include the device of example 1 and/or some other example herein, wherein multiple null tone sets across a frequency domain are available for SR transmission, and each set may be encoded by a P-matrix over multiple orthogonal frequency-division multiplexing (OFDM) symbols in a time domain.

Example 9 may include the device of example 1 and/or some other example herein, wherein the processing circuitry may be further configured to transmit an LL packet in a next downlink (DL) PPDU if the LL packet may be intended for an LL STA during a transmission of a next DL PPDU.

Example 10 may include a non-transitory computer-readable medium storing computer-executable instructions which when executed by one or more processors result in performing operations comprising: establishing time gaps between consecutive physical layer (PHY) convergence protocol data units (PPDUs) to facilitate preemption opportunity for low latency (LL) transmission; detecting a suspend/resource request (SR) transmitted over predefined null tones, wherein the SR may be received from a station device (STA); determining if a current transmit opportunity (TXOP) may be preemptable and communicate this status through a control frame; and setting a suspend request (SR) feedback report support subfield within an ultra high reliability (UHR) capabilities element based on a capability to support the SR feedback report.

Example 11 may include the non-transitory computer-readable medium of example 10 and/or some other example herein, wherein the predefined null tones are predefined and known to both an AP and STAs.

Example 12 may include the non-transitory computer-readable medium of example 10 and/or some other example herein, wherein the operations further comprise including an SR feedback report parameter set element in one or more of Beacon frames, Probe Response frames, and (Re) Association Response frames.

Example 13 may include the non-transitory computer-readable medium of example 10 and/or some other example herein, wherein the operations further comprise indicating which STAs are permitted to transmit the SR over the predefined null tones.

Example 14 may include the non-transitory computer-readable medium of example 10 and/or some other example herein, wherein the operations further comprise setting a maximum PPDU length limitation for transmitting data.

Example 15 may include the non-transitory computer-readable medium of example 10 and/or some other example herein, wherein the operations further comprise using power differentiation at a receiver side for SR detection based on values set in two continuous null tones.

Example 16 may include the non-transitory computer-readable medium of example 10 and/or some other example herein, wherein upon detection of the SR over the predefined null tones, an AP suspends a following downlink (DL) PPDU transmission and triggers an LL station device (STA) to provide feedback on buffer status or triggers the LL STA to send an uplink LL packet.

Example 17 may include the non-transitory computer-readable medium of example 10 and/or some other example herein, wherein multiple null tone sets across a frequency domain are available for SR transmission, and each set may be encoded by a P-matrix over multiple orthogonal frequency-division multiplexing (OFDM) symbols in a time domain.

Example 18 may include the non-transitory computer-readable medium of example 10 and/or some other example herein, wherein the operations further comprise transmitting an LL packet in a next downlink (DL) PPDU if the LL packet may be intended for an LL STA during a transmission of a next DL PPDU.

Example 19 may include a method comprising: establish time gaps between consecutive physical layer (PHY) convergence protocol data units (PPDUs) to facilitate preemption opportunity for low latency (LL) transmission; detect a suspend/resource request (SR) transmitted over predefined null tones, wherein the SR may be received from a station device (STA); determine if a current transmit opportunity (TXOP) may be preemptable and communicate this status through a control frame; and set a suspend request (SR) feedback report support subfield within an ultra high reliability (UHR) capabilities element based on a capability to support the SR feedback report.

Example 20 may include the method of example 19 and/or some other example herein, wherein the predefined null tones are predefined and known to both an AP and STAs.

Example 21 may include the method of example 19 and/or some other example herein, further comprising include an SR feedback report parameter set element in one or more of Beacon frames, Probe Response frames, and (Re) Association Response frames.

Example 22 may include the method of example 19 and/or some other example herein, further comprising indicate which STAs are permitted to transmit the SR over the predefined null tones.

Example 23 may include the method of example 19 and/or some other example herein, further comprising set a maximum PPDU length limitation for transmitting data.

Example 24 may include the method of example 19 and/or some other example herein, further comprising use power differentiation at a receiver side for SR detection based on values set in two continuous null tones.

Example 25 may include the method of example 19 and/or some other example herein, wherein upon detection of the SR over the predefined null tones, an AP suspends a following downlink (DL) PPDU transmission and triggers an LL station device (STA) to provide feedback on buffer status or triggers the LL STA to send an uplink LL packet.

Example 26 may include the method of example 19 and/or some other example herein, wherein multiple null tone sets across a frequency domain are available for SR transmission, and each set may be encoded by a P-matrix over multiple orthogonal frequency-division multiplexing (OFDM) symbols in a time domain.

Example 27 may include the method of example 19 and/or some other example herein, further comprising transmit an LL packet in a next downlink (DL) PPDU if the LL packet may be intended for an LL STA during a transmission of a next DL PPDU.

Example 28 may include an apparatus comprising means for: establish time gaps between consecutive physical layer (PHY) convergence protocol data units (PPDUs) to facilitate preemption opportunity for low latency (LL) transmission; detect a suspend/resource request (SR) transmitted over predefined null tones, wherein the SR may be received from a station device (STA); determine if a current transmit opportunity (TXOP) may be preemptable and communicate this status through a control frame; and set a suspend request (SR) feedback report support subfield within an ultra high reliability (UHR) capabilities element based on a capability to support the SR feedback report.

Example 29 may include the apparatus of example 28 and/or some other example herein, wherein the predefined null tones are predefined and known to both an AP and STAs.

Example 30 may include the apparatus of example 28 and/or some other example herein, further comprising include an SR feedback report parameter set element in one or more of Beacon frames, Probe Response frames, and (Re) Association Response frames.

Example 31 may include the apparatus of example 28 and/or some other example herein, further comprising indicate which STAs are permitted to transmit the SR over the predefined null tones.

Example 32 may include the apparatus of example 28 and/or some other example herein, further comprising set a maximum PPDU length limitation for transmitting data.

Example 33 may include the apparatus of example 28 and/or some other example herein, further comprising use power differentiation at a receiver side for SR detection based on values set in two continuous null tones.

Example 34 may include the apparatus of example 28 and/or some other example herein, wherein upon detection of the SR over the predefined null tones, an AP suspends a following downlink (DL) PPDU transmission and triggers an LL station device (STA) to provide feedback on buffer status or triggers the LL STA to send an uplink LL packet.

Example 35 may include the apparatus of example 28 and/or some other example herein, wherein multiple null tone sets across a frequency domain are available for SR transmission, and each set may be encoded by a P-matrix over multiple orthogonal frequency-division multiplexing (OFDM) symbols in a time domain.

Example 36 may include the apparatus of example 28 and/or some other example herein, further comprising transmit an LL packet in a next downlink (DL) PPDU if the LL packet may be intended for an LL STA during a transmission of a next DL PPDU.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   establish time gaps between consecutive physical layer (PHY) convergence protocol data units (PPDUs) to facilitate preemption opportunity for low latency (LL) transmission;
   detect a suspend/resource request (SR) transmitted over predefined null tones, wherein the SR is received from a station device (STA);
   determine if a current transmit opportunity (TXOP) is preemptable and communicate this status through a control frame; and
   set a suspend request (SR) feedback report support subfield within an ultra high reliability (UHR) capabilities element based on a capability to support the SR feedback report.

2. The device of claim 1, wherein the predefined null tones are predefined and known to both an AP and STAs.

3. The device of claim 1, wherein the processing circuitry is further configured to include an SR feedback report parameter set element in one or more of Beacon frames, Probe Response frames, and (Re) Association Response frames.

4. The device of claim 1, wherein the processing circuitry is further configured to indicate which STAs are permitted to transmit the SR over the predefined null tones.

5. The device of claim 1, wherein the processing circuitry is further configured to set a maximum PPDU length limitation for transmitting data.

6. The device of claim 1, wherein the processing circuitry is further configured to use power differentiation at a receiver side for SR detection based on values set in two continuous null tones.

7. The device of claim 1, wherein upon detection of the SR over the predefined null tones, an AP suspends a following downlink (DL) PPDU transmission and triggers an LL station device (STA) to provide feedback on buffer status or triggers the LL STA to send an uplink LL packet.

8. The device of claim 1, wherein multiple null tone sets across a frequency domain are available for SR transmission, and each set is encoded by a P-matrix over multiple orthogonal frequency-division multiplexing (OFDM) symbols in a time domain.

9. The device of claim 1, wherein the processing circuitry is further configured to transmit an LL packet in a next downlink (DL) PPDU if the LL packet is intended for an LL STA during a transmission of a next DL PPDU.

10. A non-transitory computer-readable medium storing computer-executable instructions which when executed by one or more processors result in performing operations comprising:
   establishing time gaps between consecutive physical layer (PHY) convergence protocol data units (PPDUs) to facilitate preemption opportunity for low latency (LL) transmission;
   detecting a suspend/resource request (SR) transmitted over predefined null tones, wherein the SR is received from a station device (STA);
   determining if a current transmit opportunity (TXOP) is preemptable and communicate this status through a control frame; and
   setting a suspend request (SR) feedback report support subfield within an ultra high reliability (UHR) capabilities element based on a capability to support the SR feedback report.

11. The non-transitory computer-readable medium of claim 10, wherein the predefined null tones are predefined and known to both an AP and STAs.

12. The non-transitory computer-readable medium of claim 10, wherein the operations further comprise including an SR feedback report parameter set element in one or more of Beacon frames, Probe Response frames, and (Re) Association Response frames.

13. The non-transitory computer-readable medium of claim 10, wherein the operations further comprise indicating which STAs are permitted to transmit the SR over the predefined null tones.

14. The non-transitory computer-readable medium of claim 10, wherein the operations further comprise setting a maximum PPDU length limitation for transmitting data.

15. The non-transitory computer-readable medium of claim 10, wherein the operations further comprise using power differentiation at a receiver side for SR detection based on values set in two continuous null tones.

16. The non-transitory computer-readable medium of claim 10, wherein upon detection of the SR over the predefined null tones, an AP suspends a following downlink (DL) PPDU transmission and triggers an LL station device (STA) to provide feedback on buffer status or triggers the LL STA to send an uplink LL packet.

17. The non-transitory computer-readable medium of claim 10, wherein multiple null tone sets across a frequency domain are available for SR transmission, and each set is encoded by a P-matrix over multiple orthogonal frequency-division multiplexing (OFDM) symbols in a time domain.

18. The non-transitory computer-readable medium of claim 10, wherein the operations further comprise transmitting an LL packet in a next downlink (DL) PPDU if the LL packet is intended for an LL STA during a transmission of a next DL PPDU.

19. A method comprising:

establish time gaps between consecutive physical layer (PHY) convergence protocol data units (PPDUs) to facilitate preemption opportunity for low latency (LL) transmission;

detect a suspend/resource request (SR) transmitted over predefined null tones, wherein the SR is received from a station device (STA);

determine if a current transmit opportunity (TXOP) is preemptable and communicate this status through a control frame; and set a suspend request (SR) feedback report support subfield within an ultra high reliability (UHR) capabilities element based on a capability to support the SR feedback report.

20. The method of claim 19, wherein the predefined null tones are predefined and known to both an AP and STAs.

\* \* \* \* \*